United States Patent
Pautis et al.

(10) Patent No.: US 8,678,791 B2
(45) Date of Patent: Mar. 25, 2014

(54) FAN COMPRISING ANTI-DEFLAGRATION HOUSING

(75) Inventors: Olivier Pautis, Merville (FR); Nicolas Sentenac, Aucamville (FR)

(73) Assignee: Technofan, Blagnac (FR)

( * ) Notice: Subject to any disclaimer, the term of this patent is extended or adjusted under 35 U.S.C. 154(b) by 238 days.

(21) Appl. No.: 13/035,655

(22) Filed: Feb. 25, 2011

(65) Prior Publication Data

US 2011/0229354 A1 Sep. 22, 2011

(30) Foreign Application Priority Data

Feb. 26, 2010 (FR) ...................................... 10 51380

(51) Int. Cl.
*F04B 35/04* (2006.01)

(52) U.S. Cl.
USPC ................. 417/423.8; 417/366; 417/423.1; 417/423.14

(58) Field of Classification Search
USPC ............ 417/366, 423.1, 423.7, 423.8, 423.14
See application file for complete search history.

(56) References Cited

U.S. PATENT DOCUMENTS

| | | | | |
|---|---|---|---|---|
| 5,289,612 A | * | 3/1994 | Glenn, III | 15/326 |
| 2002/0014840 A1 | * | 2/2002 | Kaneko et al. | 313/587 |
| 2008/0226442 A1 | * | 9/2008 | Darnis et al. | 415/118 |
| 2008/0298952 A1 | * | 12/2008 | Bouchard | 415/118 |

FOREIGN PATENT DOCUMENTS

| | | | |
|---|---|---|---|
| DE | 3012715 A1 | 10/1981 | |
| DE | 19723913 A1 | 12/1998 | |
| FR | 2922610 A1 | 4/2009 | |
| FR | 2941777 A1 * | 8/2010 | ............ G01F 1/696 |
| WO | 2007020040 A1 | 2/2007 | |

OTHER PUBLICATIONS

French Search Report for French Application No. 1051380 dated Sep. 9, 2010.

* cited by examiner

*Primary Examiner* — Peter J Bertheaud
*Assistant Examiner* — Dominick L Plakkoottam
(74) *Attorney, Agent, or Firm* — Patterson & Sheridan, L.L.P.

(57) ABSTRACT

The fan comprises a first electromechanical module including a wheel supported by a shaft coupled to a driving motor, a second mechanical module including a body delimiting a space for receiving the first electromechanical module in which the wheel and the driving motor are received, and a third electronic module including a plurality of electronic components. The third electronic module includes a housing in which the plurality of electronic components is housed, the housing also comprising a deflagration protection exhaust comprising an upper wall and two inclined walls extending on either side of the upper wall so as to form a space extending substantially axially between the upper surface of the housing and the upper wall in order to allow the discharge of over-pressures in case of deflagration.

9 Claims, 4 Drawing Sheets

FAN COMPRISING ANTI-DEFLAGRATION HOUSING

CROSS-REFERENCE TO RELATED APPLICATIONS

This application claims benefit of French application number 1051380, filed Feb. 26, 2010, which is herein incorporated by reference.

BACKGROUND OF THE INVENTION

1. Field of the Invention

The present invention relates to a fan of the type comprising:

a first electromechanical module including a wheel supported by a shaft coupled to a driving motor;

a second mechanical module including a body delimiting a space for receiving the first electromechanical module in which the wheel and the driving motor are received; and a third electronic module including a plurality of electronic components.

2. Description of the Related Art

Fans of this type, used in airplane ventilation circuits to ensure air circulation in the air ducts, are known.

Such fans operate in an environment containing fuel vapors. Due to the presence of many electronic components on the fan and to that environment, the risk of fires starting and of deflagration is fairly high.

The known fans do not make it possible to contain such a fire or such a deflagration, as they do not prevent a flame from spreading.

Moreover, such fans do not allow an efficient discharge of condensates, which can cause malfunctions of the fans in time.

Lastly, the current designs of such fans are not optimized in terms of manufacture. In particular, the integration of electronic components into these fans is not done in an optimized manner, these components being attached and fixed on the body of the fans one after the other depending on the available space around the body.

SUMMARY OF THE INVENTION

One of the aims of the invention is to propose an easy-to-manufacture fan that makes it possible to contain the spread of a fire or a deflagration by preventing the spread of a flame in the environment of the fan.

To that end, the invention relates to a fan of the aforementioned type, in which the third electronic module comprises a housing in which the plurality of electronic components is housed, the housing comprising a deflagration protection exhaust comprising an upper wall and two inclined walls extending on either side of the upper wall so as to form a space extending substantially axially between the upper surface of the housing and the upper wall in order to allow the evacuation of overpressures in case of deflagration.

The fan according to the invention can include one or several of the following features:

the housing comprises a cover with a shape substantially complementary to the housing, the plurality of electronic components being housed between said housing and said cover;

the exhaust is mounted on the cover, the space extending between the upper surface of the cover and the upper wall of the exhaust;

the space is partitioned by two end walls extending on either side of the upper wall substantially perpendicular to the axial direction and by a plurality of vertical walls extending in the space between the end walls;

the vertical walls each comprise an opening, the openings being arranged to form baffles inside the space in order to allow the circulation of air and liquids in the space while preventing the propagation of a flame in said space;

one of the end walls comprises an opening making it possible to discharge overpressures and liquids from the space;

the housing is removably mounted on the body of the second mechanical module;

the first electromechanical module includes a gas flow rectifier body removably mounted on the body of the second mechanical module; and the first electromechanical module and the third electronic module are connected to each other using electrical cables.

The invention also relates to an aeronautic system characterized in that it comprises a fan as defined above.

BRIEF DESCRIPTION OF THE DRAWINGS

Other aspects and advantages of the invention will appear upon reading the following description, provided solely as an example and done in reference to the appended drawings, in which.

DETAILED DESCRIPTION

Figure 1:
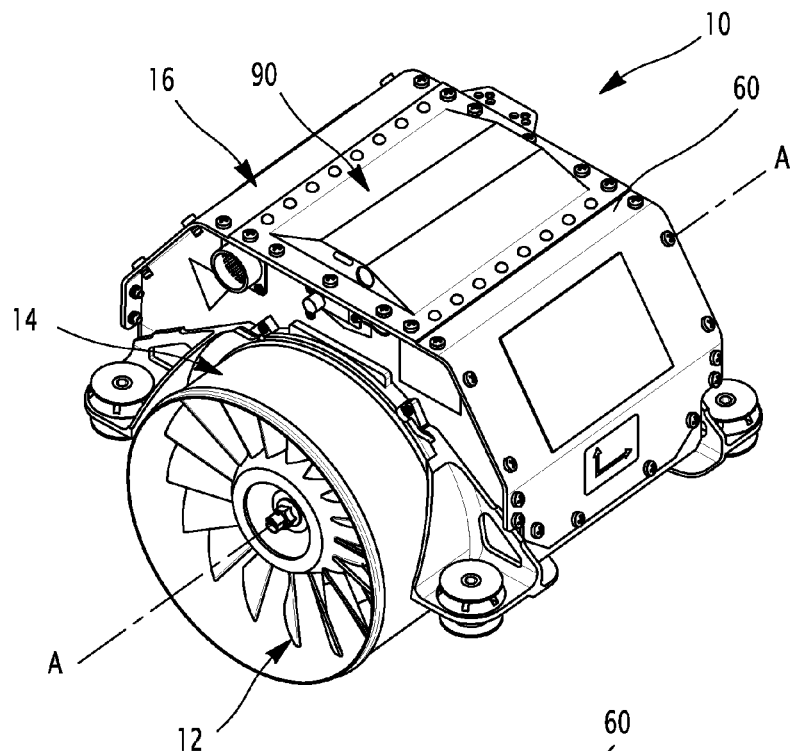
FIG. 1 is a perspective view, in the mounted state, of a fan according to the invention.

FIG. 1 illustrates a fan 10 intended to be installed in a ventilation circuit of an airplane.

The fan 10 comprises a first electromechanical module 12, a second mechanical module 14 in which the electromechanical module 12 is housed, and a third electronic module 16 mounted on the mechanical module 14.

Figure 2:
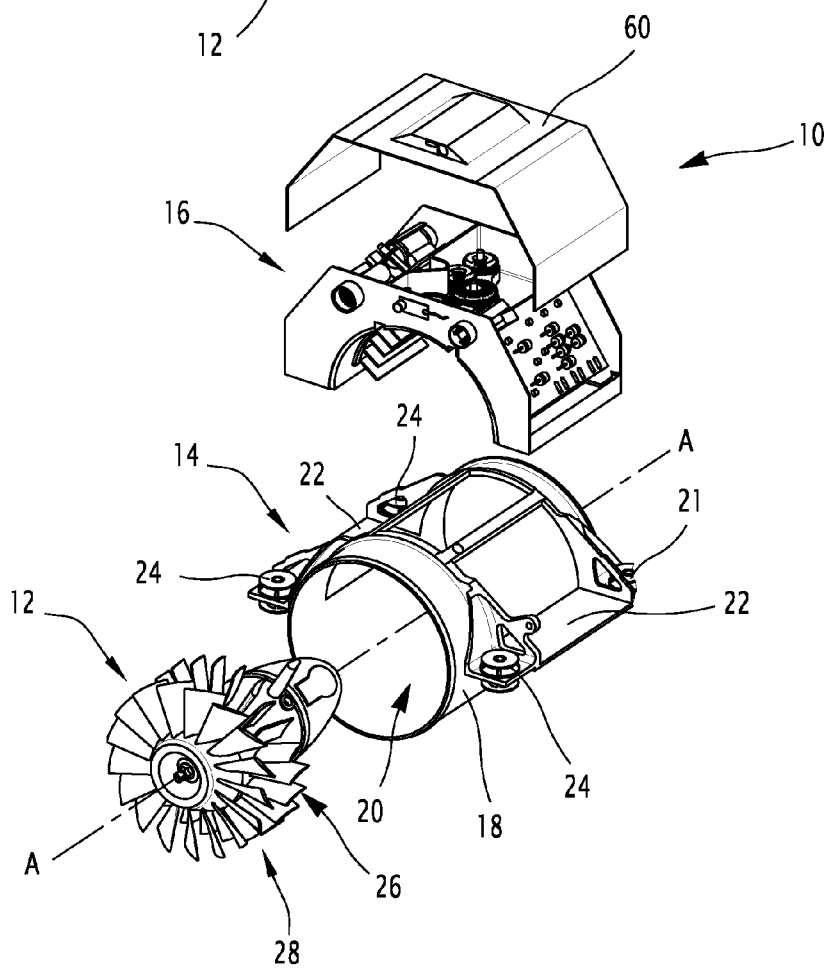
FIG. 2 is an exploded perspective view of the fan of FIG. 1.

In reference to FIG. 2, the mechanical module 14 includes a substantially cylindrical body 18, extending along a longitudinal axis A-A and delimiting a space 20 for receiving the electromechanical module 12.

The mechanical module 14 includes two diametrically opposed fastening clips 22 for fastening the electronic module 16, the two fastening clips 22 being identical and arranged symmetrically relative to a median vertical plane passing through the longitudinal axis A-A.

Each fastening clip 22 protrudes substantially radially towards the outside from the body 18 and extends substantially axially along the body 18.

The mechanical module 14 includes means for damping the vibrations undergone and/or generated by the fan 10. In the example described here, the damping means comprise four silent blocks 24 each arranged on either side of the fastening clips 22.

The electromechanical module 12 is received in the receiving space 20 of the body 18 of the mechanical module 14.

Figure 3:
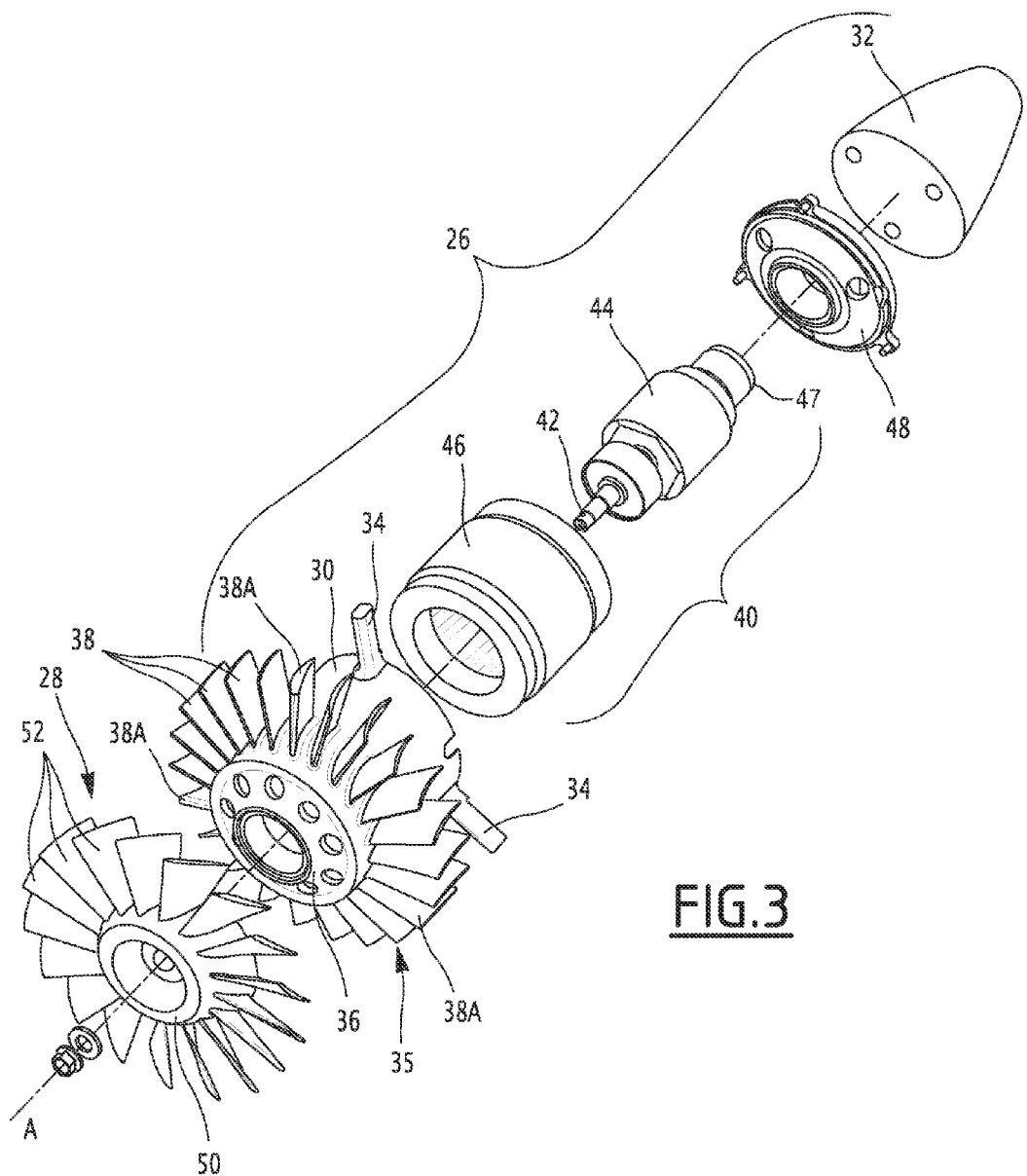
FIG. 3 is an exploded perspective view of an electromechanical module of the fan of FIG. 1.

As shown in FIG. 3, the electromechanical module 12 includes a bulb 26, extending along the longitudinal axis A-A, fixed to the body 18 and a wheel 28 mounted mobile in rotation on the bulb 26 around the longitudinal axis A-A.

The bulb 26 has a gas flow rectifier body 30 supporting a shoulder 32.

The rectifier body 30 is substantially cylindrical extending along the longitudinal axis A-A and is extended at one end by a gas flow rectifier element 35.

The rectifier body 30 includes a core 36 and a plurality of fins 38 arranged over the entire circumference of the core 36 and protruding substantially radially towards the outside from the core 36.

Some of the fins 38, e.g. three fins 38A, as well as rear arms 34, extending from the rectifier body 30 in a plane parallel to the fins 38, also serve to fix the rectifier body 30 to the body 18.

An electric motor 40 for driving the wheel 28 is supported by the rectifier body 30 and housed inside the rectifier body 30. The motor 40 is arranged along the longitudinal axis A-A of the fan 10.

The motor 40 includes a shaft 42 supporting, at its end, the wheel 28, a rotor 44 secured to the shaft 42, and a stator 46 secured to the rectifier body 30.

The shaft 42 is supported by two ball bearings 47, secured to the rotor 44, arranged on either side of the motor 40, a first ball bearing being arranged between the motor 40 and the wheel 28 and supported by the rectifier element 35, and a second ball bearing being arranged opposite the wheel 28 relative to the motor 40 and supported by an attachment flange 48 for attaching the rectifier body 30 to the fairing 32.

The wheel 28 is arranged on the side of the bulb 26 through which air is aspirated.

The wheel 28 includes a hub 50 connected to the shaft 42 and a plurality of blades 52 arranged on the entire circumference of the hub 50 and protruding radially towards the outside from the hub 50.

Figure 4:
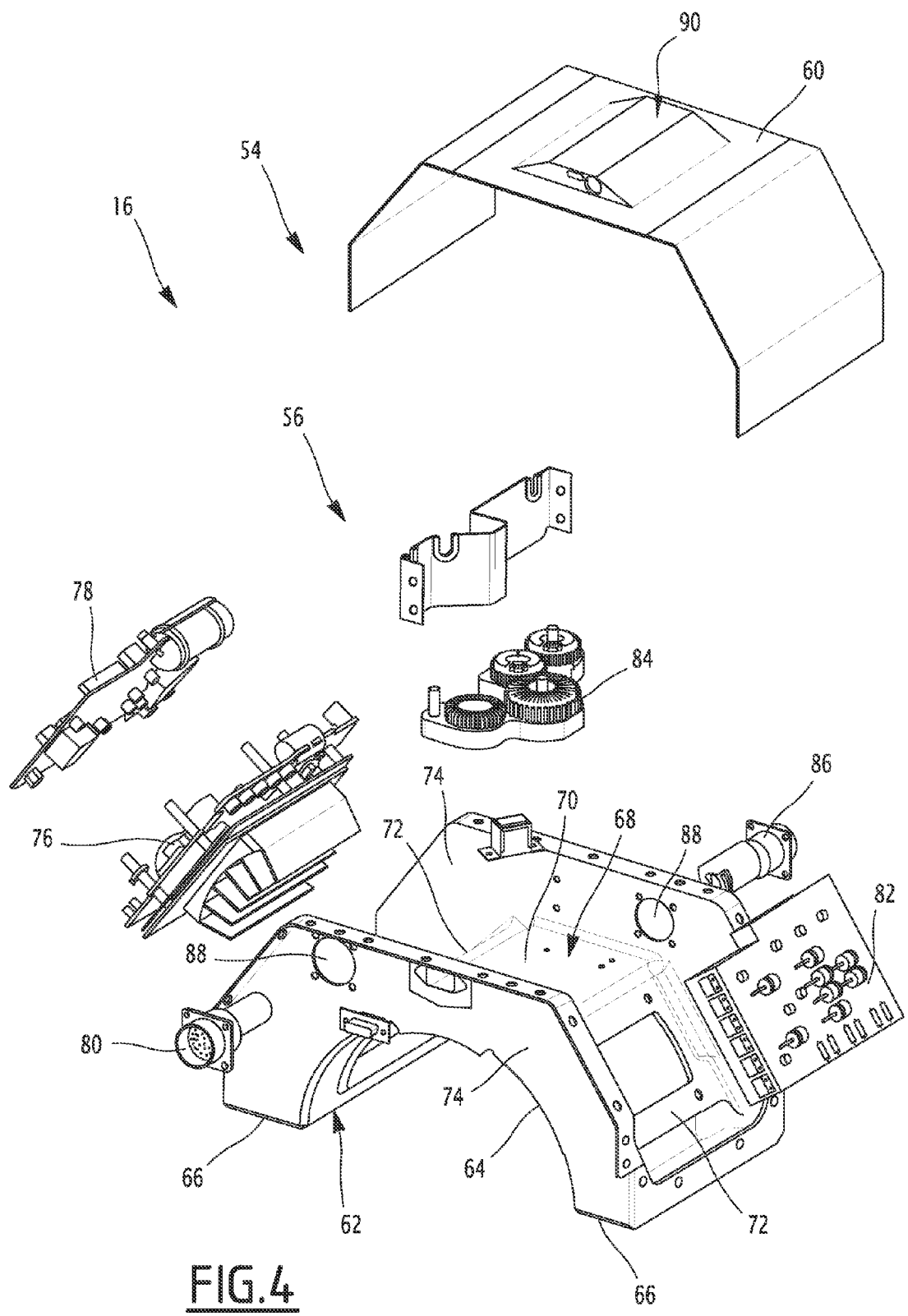
FIG. 4 is an exploded perspective view of an electronic module of the fan of FIG. 1.
Figure 5:
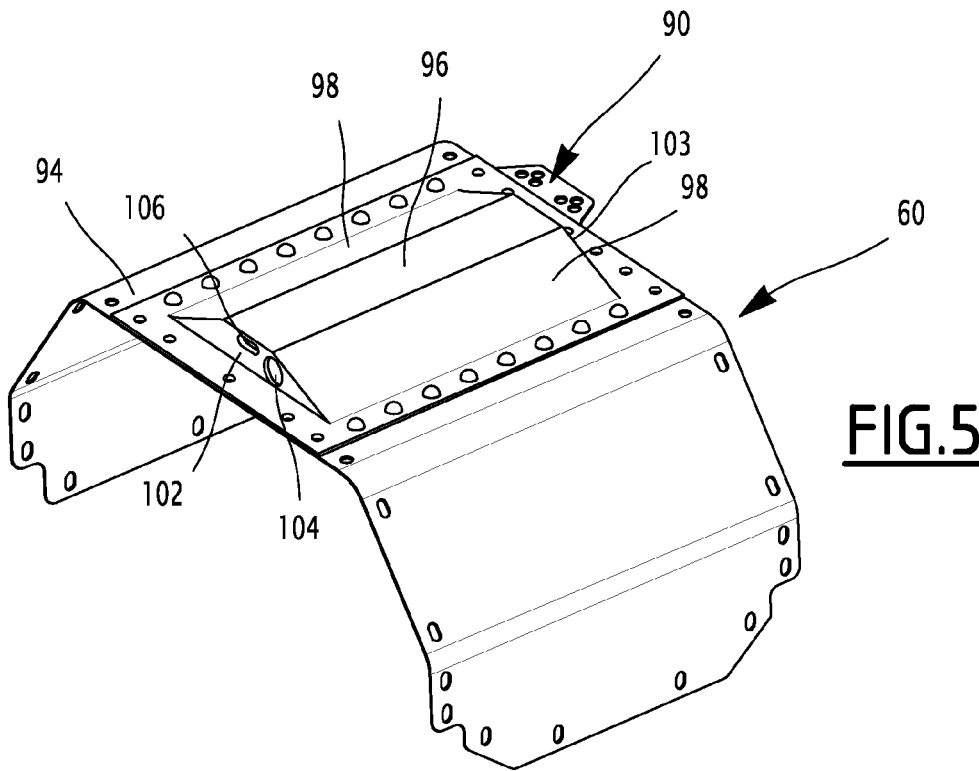
FIG. 5 is a perspective view of a cover closing the housing of the electronic module.

FIG. 4 shows the electronic module 16 of the fan 10.

The electronic module 16 includes a housing 54 and a plurality of electronic components 56 housed inside the housing 54.

The housing 54 includes a closing cover 60.

The housing 54 comprises a lower surface 62 having a central portion 64 and two lateral portions 66 extending on either side of the central portion 64.

The central portion 64 has a substantially semi-cylindrical shape, complementary to that of the body 18, while the lateral portions 66 are substantially planar so as to cooperate with the fastening clips 22 of the body 18 to fasten the housing 54 on the body 18.

The housing 54 comprises an upper surface 68 having three planar sections including a central section 70, extending substantially parallel to the lateral portions 66 and extended on either side by a lateral section 72 that is inclined relative to the central section 70.

The housing 54 also comprises two parallel transverse walls 74 that extend substantially vertically from the upper surface 68.

The cover 60 has a shape substantially identical to that of the upper surface 68 of the housing 54 and is fixed thereon, in particular along the edges of the transverse walls 74, so as to define a housing between the upper surface 68 and the cover 60 to house the electronic components 56.

The plurality of electronic components is fixed on the housing 54 and is broken down into two groups: a control group and a power group.

The control group comprises, inter alia, a control card 76, a RCC card 78, and a control assembly 80. The control card 76 and the RCC card 78 are mounted on the housing 54 between the upper surface 68 and the cover 60.

The power group comprises, inter alia, an autotransformer 82, a self card 84, and a power assembly 86. The autotransformer 82 and the self card 84 are mounted on the housing 54 between the upper surface 68 and the cover 60.

The control assembly 80 and the power assembly 86 are mounted in respective orifices 88, for example each provided on a wall 74, so as to allow the connection of electrical cables between the electronic components, arranged between the upper surface 68 and the cover 60, and the first electromechanical module 12.

The third electronic module 16 is connected to the first electromechanical module 12 by electrical cables (not shown).

The method of making the fan 10 is explained below.

The electromechanical 12, mechanical 14, and electronic 16 modules are made independently of each other.

The electromechanical module 12 is then mounted inside the mechanical module 14 by fixing the three fins 38A and the three rear arms 34 on the body 18. The rectifier body 30 is therefore removably mounted on the body 18.

Then the electronic module 16 is mounted on the mechanical module 14 by fixing the housing 54 on the fastening clips 22.

In order to limit the risk of spreading of a deflagration and fire when the fan is operating in an environment containing fuel vapors, the cover 60 comprises a deflagration protection exhaust 90 mounted on the upper surface 94 of the cover 60. The exhaust 90 comprises an upper wall 96 extending at a distance from the upper surface 94 of the cover 60 and two inclined walls 98 each extending on either side of the upper wall 96 and joining the upper wall 96 to the upper surface 94 of the cover. The upper wall 96 forms an angle relative to the upper surface 94 of the cover 60. This means that the distance separating the upper wall 96 from the upper surface 94 increases from the end portion of the upper wall 96 situated on the side through which the air is aspirated to the end portion of the opposite upper wall. This incline of the upper wall 96 and the inclined walls 98 allows the water deposited inside the deflagration protection exhaust 90 to flow so that it can be discharged efficiently.

The upper 96 and inclined 98 walls define a space 100 extending substantially axially between the upper surface 94 and the upper wall 96. The upper surface 94 of the housing 54 comprises at least one orifice 101 for communication between the inside of the housing 54 and the space 100. The space 100 is closed on either side of the upper 96 and inclined 98 walls by two substantially vertical end walls 102 and 103 extending substantially perpendicular to the axial direction. The end wall 102 situated on the side through which the air is aspirated has a height greater than the end wall 103 situated on the side opposite the space 100 and comprises an orifice 104 for discharging the overpressure, e.g. substantially circular and occupying the majority of the height of the end wall on one side of the axis A-A. The orifice 104 is for example arranged on either side of the axis A-A. The end wall 102 also comprises an orifice 106 for discharging water and air from the space 100. The orifice 106 for example assumes the form of a slit extending perpendicular to the axial direction under the upper wall 96.

Figure 6:
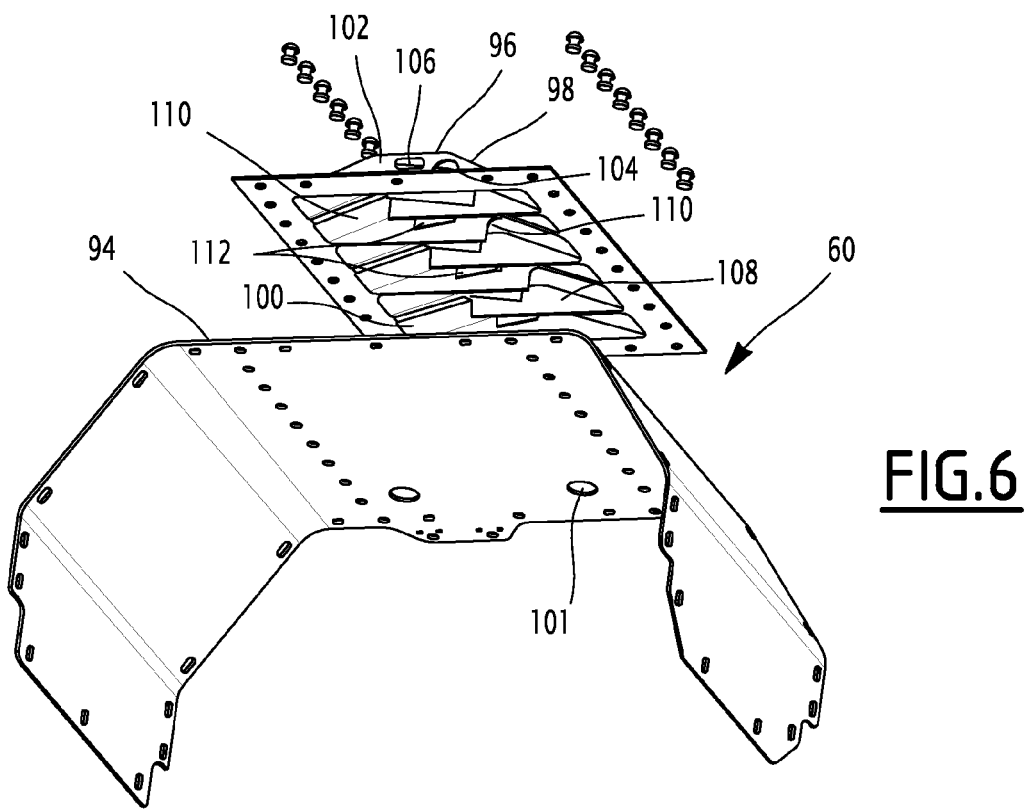
FIG. 6 is an exploded perspective view of the cover of FIG. 5.

As shown in FIG. 6, a plurality of vertical walls 108 extending substantially perpendicular to the axial direction are distributed along the space 100 between the end walls 102 and 103. These vertical walls 108 extend over the entire height of the space 100, but only occupy part of the width thereof. Thus, each vertical wall 108 comprises an opening 110 extending on one side of the axis A-A so as to allow the circulation of water in the space 100. The openings 110 are alternatingly arranged on either side of the axis A-A so as to form baffles between the vertical walls 108.

Fins 112 are also arranged between the vertical walls 108 and extend substantially vertically from the upper wall 96 parallel to the vertical walls 108. The walls 108 and the fins 112 extend substantially perpendicular to the upper surface 96 of the cover 60 and are inclined relative to the upper wall 94, for example by an angle substantially equal to 5°.

The vertical walls 108 and the fins 112 make it possible to partition the space 100 in order to avoid the propagation of a flame in the event of deflagration due to the third electronic module 16 operating in an environment likely to contain fuel vapors. The openings 110 and the fins 112 nevertheless allow the air to pass in order to discharge the overpressures produced by the deflagration in the space 100 and the water due to the condensation during use of the fan.

Thus, the deflagration protection exhaust 90 makes it possible to contain a deflagration and the propagation of a fire due to the operation of the third electronic module 16 operating in an environment likely to contain fuel vapors while allowing efficient draining of the condensates.

The cover 60 is fastened using nuts tightened on the housing 54 and the housing 54 is screwed by screws onto the body 18. The exhaust 90 is fixed on the cover 60 for example by riveting in order to ensure optimal sealing between these various parts.

The invention therefore proposes an easy-to-manufacture fan that thereby makes it possible to limit the corresponding production costs.

Indeed, the fact that the three modules are made independently of each other makes it possible to have three independent production lines and therefore better industrial management of the production of the fan.

Thus, if one of the production lines stops for any reason, for example a breakdown or a defect in one or several components, this will not affect the other two production lines.

Moreover, the fan being assembled in blocks, it is possible to disassemble a single module in an isolated manner for tests, maintenance, replacement, etc., without having to disassemble the entire fan.

Moreover, the modular design of the fan by functions makes it possible to obtain "hybrid" fans, for example by assembling the electromechanical module of a first type of fan with the mechanical module of a second type of fan and the electronic module of a third type of fan.

While the foregoing is directed to embodiments of the present invention, other and further embodiments of the invention may be devised without departing from the basic scope thereof, and the scope thereof is determined by the claims that follow.

The invention claimed is:

1. A fan of the type comprising:
a first electromechanical module including a wheel supported by a shaft coupled to a driving motor, said shaft extending along a longitudinal axis;
a second mechanical module including a body delimiting a space for receiving the first electromechanical module in which the wheel and the driving motor are received; and
a third electronic module including a plurality of electronic components,
wherein the third electronic module comprises a housing in which the plurality of electronic components are housed, the housing comprising a deflagration protection exhaust comprising an upper wall extending along the longitudinal axis and two inclined walls each extending along an axis parallel to the longitudinal axis on either side of the upper wall so as to form a space extending substantially along the longitudinal axis between the upper surface of the housing and the upper wall, said space being open at both longitudinal ends thereof in order to allow the evacuation of overpressures in case of deflagration.

2. Then fan according to claim 1, wherein the housing comprises a cover with a shape substantially complementary to the housing, the plurality of electronic components being housed between said housing and said cover.

3. The fan according to claim 2, wherein the exhaust is mounted on the cover, the space extending between the upper surface of the cover and the upper wall of the exhaust.

4. The fan according to claim 1, wherein the space is partitioned by two end walls extending on either side of the upper wall substantially perpendicular to the longitudinal axis and by a plurality of vertical walls extending in the space between the end walls.

5. The fan according to claim 4, wherein the vertical walls each comprise an opening, the openings being arranged to form baffles inside the space in order to allow the circulation of air and liquids in the space while preventing the propagation of a flame in said space.

6. The fan according to claim 4, wherein one of the end walls comprises an opening making it possible to discharge overpressures and liquids from the space.

7. The fan according to claim 1, wherein the housing is removably mounted on the body of the second mechanical module.

8. The fan according to claim 1, wherein the first electromechanical module includes a gas flow rectifier body removably mounted on the body of the second mechanical module.

9. An aeronautic system, wherein the aeronautic system comprises a fan according to claim 1.

* * * * *